United States Patent
Browne et al.

(10) Patent No.: US 6,920,675 B2
(45) Date of Patent: Jul. 26, 2005

(54) PROCESS FOR ATTACHMENT AND/OR DISENGAGEMENT OF COMPONENTS

(75) Inventors: Alan Lampe Browne, Grosse Pointe, MI (US); Nancy L. Johnson, Northville, MI (US); Bob Ross Powell, Jr., Birmingham, MI (US); William Barvosa-Carter, Ventura, CA (US); Leslie A. Momoda, Los Angeles, CA (US); Thomas B. Stanford, Port Hueneme, CA (US)

(73) Assignee: General Motors Corporation, Detroit, MI (US)

( * ) Notice: Subject to any disclaimer, the term of this patent is extended or adjusted under 35 U.S.C. 154(b) by 54 days.

(21) Appl. No.: 10/611,844

(22) Filed: Jul. 1, 2003

(65) Prior Publication Data

US 2005/0000065 A1 Jan. 6, 2005

(51) Int. Cl.$^7$ .......................... B23P 19/04; A44B 21/00
(52) U.S. Cl. ........................ 29/426.4; 24/448
(58) Field of Search ................. 24/442, 444, 447, 24/448, 450, 306, 304; 29/426.4

(56) References Cited

U.S. PATENT DOCUMENTS

| | | | |
|---|---|---|---|
| 3,469,289 A | * | 9/1969 | Whitacre .................. 24/450 |
| 4,637,944 A | | 1/1987 | Walker ..................... 428/35 |
| 4,642,254 A | | 2/1987 | Walker ..................... 428/36 |
| 5,037,178 A | | 8/1991 | Stoy et al. ................ 385/53 |
| 5,725,928 A | | 3/1998 | Kenney et al. ........... 428/100 |
| 6,086,599 A | | 7/2000 | Lee et al. ................ 606/108 |
| 6,102,912 A | | 8/2000 | Cazin et al. ............... 606/61 |
| 6,102,933 A | | 8/2000 | Lee et al. ................ 606/209 |
| 6,156,842 A | | 12/2000 | Hoenig et al. ........... 525/171 |
| 6,388,043 B1 | | 5/2002 | Langer et al. ............. 528/80 |
| 6,546,602 B1 | * | 4/2003 | Eipper et al. ............. 24/442 |
| 6,598,274 B1 | * | 7/2003 | Marmaropoulos ......... 24/442 |
| 6,766,566 B2 | * | 7/2004 | Cheng et al. ............. 24/304 |
| 2002/0007884 A1 | | 1/2002 | Schuster et al. | |
| 2002/0050045 A1 | | 5/2002 | Chiodo et al. | |
| 2002/0062547 A1 | | 5/2002 | Chiodo et al. | |

FOREIGN PATENT DOCUMENTS

| | | |
|---|---|---|
| EP | 0385443 | 2/1990 |
| WO | WO99/42528 | 8/1999 |
| WO | WO 00/62637 | 10/2000 |
| WO | WO 01/84002 | 11/2001 |
| WO | WO 02/45536 | 6/2002 |

* cited by examiner

Primary Examiner—Jack W. Lavinder
(74) Attorney, Agent, or Firm—Kathryn A. Marra

(57) ABSTRACT

Processes for providing rapid release of a hook and loop type releasable fastener system comprise preconditioning the releasable fastener system to effect rapid release. In this manner, minimal energy and time is required for disengagement of the releasable fastener system.

17 Claims, 2 Drawing Sheets

PROCESS FOR ATTACHMENT AND/OR DISENGAGEMENT OF COMPONENTS

BACKGROUND

This disclosure relates to an apparatus and process for on-demand attachment and/or disengagement of components, and more particularly, to on-demand attachment and/or disengagement of components in response to an activation signal.

Hook and loop type separable fasteners are well known and are used to join two members detachably to each other. These types of fasteners generally have two components disposed on opposing member surfaces. One component typically includes a plurality of resilient hooks while the other component typically includes a plurality of loops. When the two components are pressed together they interlock to form a releasable engagement. The resulting joint created by the engagement is relatively resistant to shear and pull forces, and weak in peel strength forces. As such, peeling one component from the other component can be used to separate the components with a minimal applied force. As used herein, the term "shear" refers to an action or stress resulting from applied forces that causes or tends to cause two contiguous parts of a body to slide relative to each other in a direction parallel to their plane of contact. The term "pull force" refers to an action or stress resulting from applied forces that causes or tends to cause two contiguous parts of a body to move relative to each other in the direction perpendicular to their plane of contact. Hook and loop type separable fasteners can require different release times to maximize effectiveness for different applications. In some applications, release times are not critical whereas in other applications release times are critical and may be on the order of a few milliseconds.

Shape memory materials generally refer to materials or compositions that have the ability to remember their original shape, which can subsequently be recalled by applying an external stimulus. As such, deformation from the original shape is a temporary condition. Exemplary shape memory materials include shape memory alloys, shape memory polymers, and the like.

Shape memory alloys (SMA's) generally refer to a group of metallic materials that demonstrate the ability to return to some previously defined shape or size when subjected to an appropriate thermal stimulus. Shape memory alloys are capable of undergoing phase transitions in which their flexural modulus, yield strength, and shape orientation are altered as a function of temperature. Generally, in the low temperature, or martensite phase, shape memory alloys can be plastically deformed and upon exposure to some higher temperature will transform to an austenite phase, or parent phase, returning to their shape prior to the deformation. Materials that exhibit this shape memory effect only upon heating are referred to as having one-way shape memory. Those materials that also exhibit shape memory upon re-cooling are referred to as having two-way shape memory behavior.

Shape memory polymers (SMP's) are known in the art and generally refer to a group of polymeric materials that demonstrate the ability to return to some previously defined shape when subjected to an appropriate thermal stimulus. Shape memory polymers are capable of undergoing phase transitions in which their shape orientation is altered as a function of temperature. Generally, SMP's have two main segments, a hard segment and a soft segment. The previously defined or permanent shape can be set by melting or processing the polymer at a temperature higher than the highest thermal transition followed by cooling below that thermal transition temperature. The highest thermal transition is usually the glass transition temperature (Tg) or melting point of the hard segment. A temporary shape can be set by heating the material to a temperature higher than the Tg or the transition temperature of the soft segment, but lower than the Tg or melting point of the hard segment. The temporary shape is set while processing the material at the transition temperature of the soft segment followed by cooling to fix the shape. The material can be reverted back to the permanent shape by heating the material above the transition temperature of the soft segment.

BRIEF SUMMARY

Disclosed herein is a process for disengaging a releasable fastener system, comprising preconditioning the releasable fastener system to a preconditioning temperature, wherein the releasable fastener system comprises a hook portion comprising a plurality of hook elements fabricated from a shape memory material and a loop portion engageable with the plurality of hook elements, and wherein the preconditioning temperature is less than the transformation temperature of the shape memory material; applying a primary activation signal to the hook portion to change a shape orientation, a flexural modulus property, or a combination thereof to the plurality of hook elements; and disengaging the hook portion from the loop portion.

In another embodiment, the process for disengaging a releasable fastener system comprises periodically preconditioning the releasable fastener system to a temperature less than a transformation temperature of a shape memory material upon receipt of a first signal, wherein the releasable fastener system comprises a hook portion comprising a plurality of hook elements fabricated from the shape memory material and a loop portion engageable with the plurality of hook elements; applying a second signal to the hook portion to change a shape orientation, a flexural modulus property, or a combination thereof to the plurality of hook elements, wherein the second signal raises the preconditioning temperature to the transformation temperature; and disengaging the hook portion from the loop portion, wherein the releasable fastener system remains engaged in the absence of the second signal.

In another embodiment, a process for operating a releasable fastener system, comprising applying a first activation signal to the releasable fastener system, wherein the releasable fastener system comprises a hook portion and a loop portion engageable with the plurality of hook elements disposed on the hook portion, wherein the plurality of hook elements comprises a first hook element portion fabricated from a shape memory material and at least one additional hook element portion fabricated from a different shape memory material; changing a shape orientation, a flexural modulus property, or a combination thereof, of the first hook element portion in response to the first activation signal; applying a second activation signal to the releasable fastener system; changing a shape orientation, a flexural modulus property, or a combination thereof, to the second hook element portion in response to the second activation signal; and disengaging the hook portion from the loop portion.

The above described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

Figure 1:
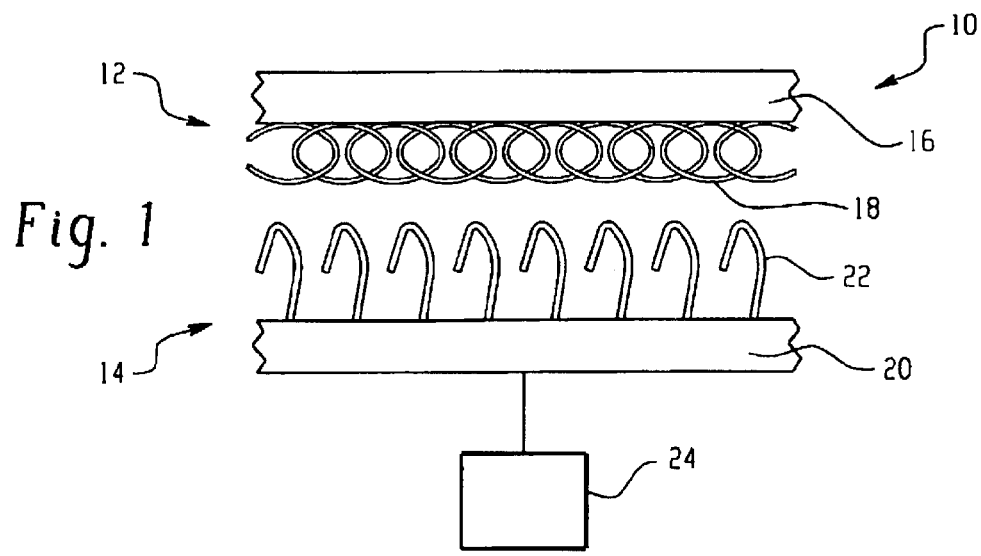
FIG. 1 is a cross sectional view of a releasable fastening system.

As shown in FIG. 1, an on-demand releasable fastener system, generally indicated as 10, comprises a loop portion 12 and a hook portion 14. As will be discussed in greater detail, the on-demand releasable fastener system 10 is suitable for applications that may require rapid disengagement of two components in as short as a few milliseconds, and as such, are suitable for a variety of applications desiring rapid release. For example, air bag deployment devices in automotive vehicles are generally triggered on the order of about 20 to about 40 milliseconds based on detects provided by a detector system such as a crash sensor. The present releasable fastener system can be employed to provide disengagement of two components within about the same time range or less, such as may be desired for the release between a battery and a vehicle structure or the like during a crash condition to dissipate the kinetic energy of the battery associated with the crash condition. Instead of a battery, other components attached to the vehicle structure can be rapidly detached, e.g., engine, fuel cells, cargo containers, and the like.

The loop portion 12 includes a loop support 16 and a loop material 18 disposed on one side thereof whereas the hook portion 14 includes a hook support 20 and a plurality of closely spaced upstanding hook elements 22 extending from one side thereof. In one embodiment, the hook elements 22 are generally comprised of shape memory materials. In another embodiment, the hook elements are comprised of two or more different shape memory materials. That is, one hook element 22 may have a different shape memory material from an adjacent hook element 22. In yet another embodiment, the hook elements 22 comprise a composite of different shape memory materials. That is, a single hook element is formed from different shape memory materials. The shape memory material provides the plurality of hook elements 22 with a shape changing capability and/or a flexural modulus property change capability that can be temperature tuned to a particular application, as will be described in greater detail. Coupled to and in operative communication with the plurality of hook elements 22 is an activation device 24. The activation device 24, on-demand, provides an activation signal or stimulus to the hook elements 22 to cause the change in the shape orientation and/or flexural modulus properties to some or all of the hook elements 22 depending on design of the releasable fastener system. The change in shape orientation and/or flexural modulus property generally remains for the duration of the applied activation signal. Upon discontinuation of the activation signal, the hook elements 22 revert to an unpowered shape, i.e., a shape suitable for engagement. As such, the releasable fastener system 10 is reversible and can be engaged/disengaged multiple times. Alternatively, the releasable fastener system can be configured to provide irreversible disengagement. In this application involving irreversible disengagement, the hook elements or loop material in contact therewith are irreversibly damaged such that subsequent engagement cannot occur without replacement of the hook elements, the loop material, or both. The illustrated releasable fastener system 10 is exemplary only and is not intended to be limited to any particular shape, size, configuration, number or shape of hook elements 22, shape of loop material 18, shape memory material, or the like.

Any shape memory material can be employed for fabricating the plurality of hook elements 22, e.g., shape memory alloys, shape memory polymers, and other like materials that exhibit a shape memory effect. The present disclosure is not intended to be limited to any particular shape memory material. Likewise, the present disclosure is not intended to be limited to any particular activation signal. The particular activation signal will depend on the sensitivity of the shape memory material. As such, depending on the particular shape memory material, to cause changes in shear and pull-off forces in the releasable fastener system, the activation device 24 may provide a thermal activation signal, magnetic activation signal, electrical activation signal, chemical activation signal, or other like activation signal.

Figure 2:
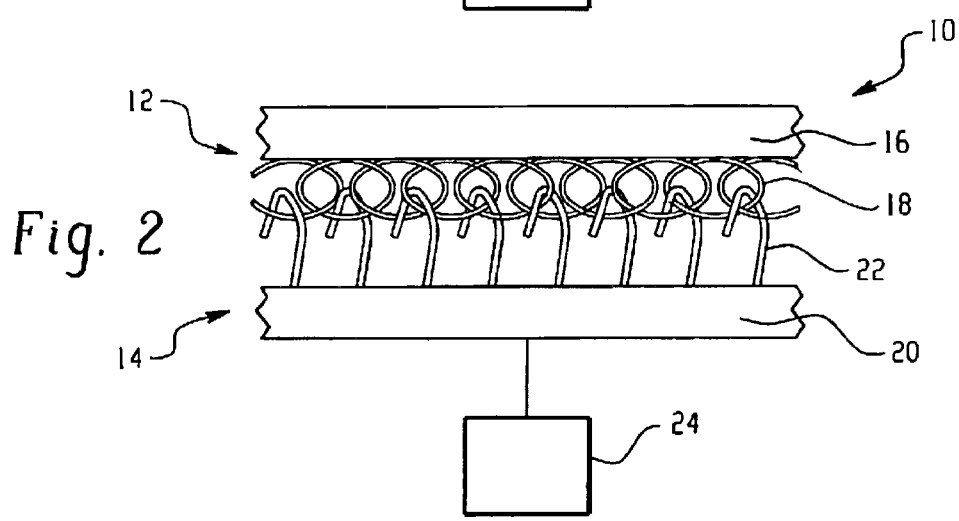
FIG. 2 is a cross sectional view of the releasable fastening system of FIG. 1, wherein the releasable fastening system is engaged.

During engagement, the two portions 12, 14 are pressed together to create a joint that is relatively strong in shear and/or pull-off directions, and weak in peel. For example, as shown in FIG. 2, when the two portions 12, 14 are pressed into face-to-face engagement, the plurality of hook elements 22 become engaged with the loop material 18 and the close spacing of the hook elements 22 resists substantial lateral movement when subjected to shearing forces in the plane of engagement. Similarly, when the engaged joint is subjected to a force substantially perpendicular to this plane, (i.e., pull-off forces), the hook elements 22 resist substantial separation of the two portions 12, 14. However, when the hook elements 22 are subjected to a peeling force, the hook elements 22 can become readily disengaged from the loop material 18 since only a few hook elements are being disengaged at any given time, thereby separating the hook portion 12 from the loop portion 14. It should be noted that separating the two portions 12, 14 by applying the peeling force in the engaged state generally requires that one or both of the supports 18, 20 forming the respective loop and hook portions 12, 14 be flexible.

Figure 3:
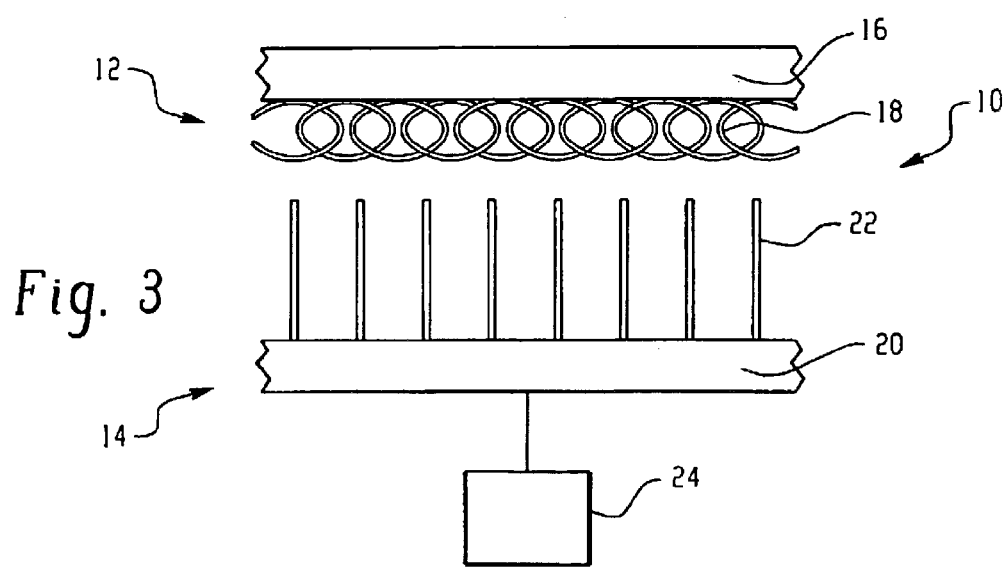
FIG. 3 is a cross sectional view of the releasable fastening system of FIG. 1, wherein the releasable fastening system is disengaged.

To reduce the shear and pull-off forces resulting from the engagement, the shape orientation and/or flexural modulus properties of the hook elements 22 are altered upon receipt of the activation signal from the activation device 24 to provide a remote releasing mechanism of the engaged joint. That is, the change in shape orientation and/or flexural modulus of at least some of the hook elements 22 reduces the required forces for shearing in the plane of engagement, and pull off perpendicular to the plane of engagement. For example, as shown in FIGS. 2 and 3, the plurality of hook elements 22 can have inverted J-shaped orientations that are changed, upon-demand, to substantially straightened shape orientations upon receiving the activation signal from the activation device 24. The substantially straightened shape relative to the J-shaped orientation provides the joint with marked reductions in shear and/or pull-off forces. Similarly, a reduction in shear and/or pull off forces can be observed by changing the yield strength, and/or flexural modulus of the hook elements. The change in yield strength and/or flexural modulus properties can be made independently, or in combination with the change in shape orientation. For example, changing the flexural modulus properties of the hook elements 22 to provide an increase in flexibility will reduce the shear and/or pull-off forces. Conversely, changing the flexural modulus properties of the hook elements 22 to decrease flexibility (i.e., increase stiffness) can be used to increase the shear and pull-off forces when engaged. Similarly, changing the yield strength properties of the hook elements to increase the yield strength can be used to increase the shear and pull-off forces when engaged. In both cases, the holding force is increased, thereby providing a stronger joint.

As previously discussed, suitable shape memory materials that can undergo a shape change and/or change in flexural modulus properties in response to an activation signal include shape memory alloy compositions. Shape memory alloys typically exist in several different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$). When the shape memory alloy is in the austenite phase and is cooled, it begins to change into the martensite phase, and the temperature at which this phenomenon starts is referred to as the martensite start temperature ($M_s$). The temperature at which austenite finishes transforming to martensite is called the martensite finish temperature ($M_f$). Generally, the shape memory alloys are soft and easily deformable in their martensitic phase and are hard, stiff, and/or rigid in the austenitic phase. In view of the foregoing, a suitable activation signal for use with shape memory alloys is a thermal activation signal having a magnitude effective to cause transformations between the martensite and austenite phases.

Depending on the phase transformation temperatures for the particular shape memory alloy composition, the releasable fastener system 10 can be configured with a variety of capabilities. For example, in a so-called "hot-hold" configuration, the hook elements 22 may be fabricated from shape memory alloys that exhibit an austenite phase at an ambient environmental temperature in which the releasable fastener system 10 is disposed and with a shape effective for engagement with the loop material 18. Thermal activation would thus require cooling the hook elements 22 to a temperature below the austenite temperature to the martensite phase transformation temperature. In so doing, decreasing the bending stiffness of the hook elements 22 and thus the strength of the attachment. Alternatively, in a so-called "cold-hold" configuration, the hook elements 22 may be fabricated and engaged with the loop portion 18 in a martensite phase, wherein the martensite phase transformation is at or above the ambient environmental conditions in which the releasable fastener system 10 is disposed. Thus, heating the hook elements 22 to an austenite finish temperature would, given the proper materials processing, preferably cause the hook elements 22 to straighten and cause disengagement.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the martensite to austenite type transition, and the material will recover the original, annealed shape. Hence, one-way shape memory effects are only observed upon heating. Hook elements formed from shape memory alloy compositions that exhibit one-way memory effects do not automatically reform, and depending on the hook element design, will likely require an external mechanical force to reform the shape orientation that was previously suitable for engagement with the loop portion.

Intrinsic and extrinsic two-way shape memory materials are characterized by a shape transition both upon heating from the martensite phase to the austenite phase, as well as an additional shape transition upon cooling from the austenite phase back to the martensite phase. Hook elements 22 that exhibit an intrinsic one-way shape memory effect are fabricated from a shape memory alloy composition that will cause the hook elements to automatically reform themselves as a result of the above noted phase transformations. Intrinsic two-way shape memory behavior must be induced in the shape memory material through processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, hook elements 22 that exhibit the extrinsic two-way shape memory effects are composite or multi-component materials that combine a shape memory alloy composition that exhibits a one-way effect with another element that provides a restoring force to reform the hook-like shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the hook elements with shape memory effects, superelastic effects, and high damping capacity.

Suitable shape memory alloy materials for fabricating the hook elements include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape orientation, changes in yield strength, and/or flexural modulus properties, damping capacity, and the like. A preferred shape memory alloy is a nickel-titanium based alloy commercially available under the trademark NITINOL from Shape Memory Applications, Inc.

Another suitable class of shape memory materials are shape memory polymers (SMP). Hook elements 22 comprising an SMP provide a reduction in a shear force and/or a pull-off force of an engaged hook and loop portion when an appropriate activation signal is provided. To set the permanent shape of the SMP hook elements, the polymer must be formed at about or above the Tg or melting point of the hard segment of the polymer. "Segment" refers to a block or sequence of polymer forming part of the SMP. The SMP hook elements are shaped at this temperature with an applied force followed by cooling to set the permanent shape. The temperature necessary to set the permanent shape is between about 100° C. to about 300° C. Setting the temporary shape of the SMP hook elements requires the SMP material to be brought to a temperature at or above the Tg or transition temperature of the soft segment, but below the Tg or melting point of the hard segment. At the soft segment transition temperature (also termed "first transition temperature"), the temporary shape of the SMP hook elements is set followed by cooling of the SMP to lock in the temporary shape. The temporary shape is maintained as long as the hook elements remain below the soft segment transition temperature. The permanent shape is regained when the SMP hook elements are once again brought to or above the transition temperature of the soft segment. Repeating the heating, shaping, and cooling steps can reset the temporary shape. The soft segment transition temperature can be chosen for a particular application by modifying the structure and composition of the polymer. Transition temperatures of the soft segment range from about −63° C. to above about 120° C.

Shape memory polymers may contain more than two transition temperatures. An SMP composition comprising a hard segment and two soft segments can have three transition temperatures: the highest transition temperature for the hard segment and a transition temperature for each soft segment. The presence of the second soft segment allows for the SMP composition to exhibit two permanent shapes.

Most shape memory polymers exhibit a "one-way" effect, wherein the SMP exhibits one permanent shape. Upon heating the SMP above the first transition temperature, the permanent shape is achieved and the shape will not revert back to the temporary shape without the use of outside forces. As an alternative, some shape memory polymer compositions can be prepared having a "two-way" effect. These systems consist of at least two polymer components. For example, one component could be a first cross-linked polymer while the other component is a different cross-linked polymer. The components are combined by layer techniques, or are interpenetrating networks, wherein two components are cross-linked but not to each other. By changing the temperature, the shape memory polymer changes its shape in the direction of the first permanent shape or the second permanent shape. Each of the permanent shapes belongs to one component of the shape memory polymer. As such, the shape defined by the shape memory polymer having a two way effect will be in equilibrium between the two different permanent shapes. The temperature dependence of the shape is caused by the fact that the mechanical properties of one component ("component A") are almost independent from the temperature in the temperature interval of interest. The mechanical properties of the other component ("component B") depend on the temperature. In one embodiment, component B becomes stronger at low temperatures compared to component A, while component A is stronger at high temperatures and determines the actual shape. A two-way memory device can be prepared by setting the permanent shape of component A ("first permanent shape"); deforming the device into the permanent shape of component B ("second permanent shape"); and fixing the permanent shape of component B while applying a stress to the component.

In a preferred embodiment, the permanent shape of the shape memory hook elements 22 is a substantially straightened shape and the temporary shape of the hook elements 22 is an inverted J-shape (see FIGS. 1–3). In another embodiment, the shape memory polymer comprises two permanent shapes. In the first permanent shape the hook elements 22 are in a substantially straightened shape and in the second permanent shape, the hook elements 22 are in an inverted J-shape.

The temperature needed for permanent shape recovery can be set at any temperature between about −63° C. and about 120° C. or above. Engineering the composition and structure of the polymer itself can allow for the choice of a particular temperature for a desired application. A preferred temperature for shape recovery is greater than or equal to about −30° C., more preferably greater than or equal to about 0° C., and most preferably a temperature greater than or equal to about 50° C. Also, a preferred temperature for shape recovery is less than or equal to about 120° C., more preferably less than or equal to about 90° C., and most preferably less than or equal to about 70° C.

Shape memory polymers can be thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether), ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsequioxane), polyvinylchloride, urethane/butadiene copolymers, polyurethane block copolymers, styrene-butadiene-styrene block copolymers, and the like.

In one embodiment, the plurality of hook elements 22 is comprised of two or more different shape memory materials, wherein one hook element is fabricated from a different shape memory material than an adjacent hook element 22. The various hook elements may comprise shape memory alloys, different shape memory polymers, a combination of shape memory alloys and polymers, composite structures, or the like. In this manner, the hook elements 22, depending on the properties of the shape memory material, will have different properties, i.e., different phase transformations.

In another embodiment, the plurality of hook elements 22 comprises composites of different shape memory materials. That is, a single hook element is formed of different shape memory materials. As such, the degree and speed at which shape and/or flexural modulus change in individual hook elements can be carefully controlled, if desired. Hook elements 22 fabricated from composites can take many forms including but not limited to, admixtures of different shape memory materials, layers of different shape memory materials, and the like. For example, a shape memory alloy fiber having a shape memory polymer sheath can be employed as a composite. In this example, the shape memory alloy fibers may also act to increase heat transfer to the shape memory polymer to more efficiently activate the shape memory polymer.

The hook elements 22 are fixedly attached to hook support 20 or may be integrally formed with the support 20. The mechanical engagement of the hook portion 14 with the loop portion 12 can be achieved by interaction of the hook elements 22 with the loop material 18 or through physical deformation of suitably arranged hook elements 22 during the face-to-face engagement. That is, each hook element 22 preferably maintains a shape orientation conducive for contact engagement with the loop material 18. Physical deformation may also be employed to provide a shape orientation suitable for the engagement with the loop portion 18.

In another embodiment, the superelastic properties of the shape memory material can be employed, if applicable. As such, the hook elements 22 can be fabricated from selected shape memory alloy compositions that maintain the austenite phase at different environmental temperature conditions in which the fastener is to be employed. The shape of the hook elements 22 in the austenite phase would be suitable for engagement with the loop material 18. Cooling the hook elements 22 to a temperature below the different austenite phases (i.e., to the respective martensite phase) provides the hook elements with superelasticity and reduces the shear and pull off forces resulting from the engagement of the hook elements 22 with the loop material 18 while in the austenite phase. Since different materials can be employed, the reduction in shear and pull off forces can be carefully controlled. For example, a portion of the hook elements fabricated from shape memory alloy composition can be selected to exhibit an austenite phase at about room temperature. Another portion can be selected to exhibit an austenite phase at about 0° C. Lowering the temperature of the hook elements 22 below room temperature would cause a portion of the hook elements 22 to transform from the stiffer austenite phase to the weaker martensite phase, thereby permitting separation in the shear and/or pull off directions at significantly lower force levels. Further lowering the temperature to below about 0° C. would provide a further reduction in shear and/or pull-off directions since the other portion would also be transformed from the stiffer austenite phase to the weaker martensite phase.

In practice, the spacing between adjacent hook elements 22 is in an amount effective to provide the hook portion with sufficient shear and/or pull off resistance desired for the particular application during engagement with the loop portion. Depending on the desired application, the amount of shear and/or pull-off force required for effective engagement can vary significantly. Generally, the closer the spacing and the greater the amount of the hook elements employed will result in increased shear and/or pull off forces upon engagement.

The hook elements 22 preferably have a shape configured to become engaged with the loop material 18 upon pressing contact of the loop portion 12 with the hook portion 14, and vice versa. As such, the hook elements 22 are not intended to be limited to any particular shape. In the engaged mode, the hook elements 22 can have an inverted J-shaped orientation, a mushroom shape, a knob shape, a multi-tined anchor, T-shape, spirals, or any other form of a hook-like element used for separable hook and loop fasteners. Such elements are referred to herein as "hook-like", "hook-type", or "hook" elements whether or not they are in the shape of a hook. Likewise, the loop material 18 may comprise a plurality of loops or pile, a shape complementary to the hook element 22 (e.g., a key and lock type engagement), or any other form of a loop-like element used for separable hook and loop fasteners. The thickness of the shape memory material should also be of a thickness effective to provide the desired shape memory effect. As such, the cross sectional shape of the hook elements includes a circle, an oval, a cross, a square, a rectangle, and the like. The hook elements are not intended to be limited to any particular cross sectional shape.

The arrays of hook elements 22 of various geometries and/or loop material 18 on the respective supports are to be so arranged and sufficiently dense such that the action of pressing the two portions together results in the mechanical engagement of the hook elements with the loop material creating a joint that is strong in shear and pull-off forces, and relatively weak in peel. Remote disengagement of the two portions is effected variously by applying a suitable activation signal. For example, hook elements 22 fabricated from shape memory alloys may be activated by raising the temperature of the shape memory alloy above its transformation temperature causing the hook elements to straighten (e.g. in those examples in which the shape memory property of the shape memory alloy is employed), and/or by lowering the temperature of the shape memory alloy to effect a switch from the stiffer austenite to the weaker martensite phase (e.g. in those examples in which the superelasticity property of shape memory alloys is employed). In this manner, changing the shape orientation, yield strength, and/or flexural modulus properties of the hook elements can be used to provide on-demand remote engagement and disengagement of joints/attachments.

The loop material 18 generally comprises a random looped pattern or pile of a material. The loop material 18 is often referred by such terms as the "soft", the "fuzzy", the "pile", the "female", or the "carpet". Suitable loop materials 18 are commercially available under the trademark VELCRO from the Velcro Industries B.V. Materials suitable for manufacturing the loop material include thermoplastics such as polypropylene, polyethylene, polyamide, polyester, polystyrene, polyvinyl chloride, acetal, acrylic, polycarbonate, polyphenylene oxide, polyurethane, polysulfone, and the like. The loop material 18 may be integrated with the loop support 16 or may be attached to the support.

Alternatively, the loop material 18 can be fabricated from the same shape changing and/or flexural modulus changing materials employed for the hook elements 22 as previously discussed. As such, instead of being passive, the loop material can be made active upon receipt of an activation signal.

The supports 20, 16 for the hook and loop portions 14, 12, respectively, may be rigid or flexible depending on the intended application. Suitable support materials include, but are not intended to be limited to, metals (such as superelastic NiTi), plastics (such as polyethylene filaments), or fabrics. For example, suitable plastics include thermoplastics such as for example polypropylene, polyethylene, polyamide, polyester, polystyrene, polyvinyl chloride, acetal, acrylic, polycarbonate, polyphenylene oxide, polyurethane, polysulfone, and other like thermoplastic polymers. An adhesive may be applied to the backside surface of the support (the surface free from the hook elements 22 or loop material) for application of the releasable fastener system to an apparatus or structure. Alternatively, the releasable fastener system may be secured to an apparatus or structure by bolts, by welding, or any other mechanical securement means. It should be noted that, unlike traditional hook and loop fasteners, both supports could be fabricated from a rigid or inflexible material in view of the remote releasing capability provided. Traditional hook and loop fasteners typically require at least one support to be flexible so that a peeling force can be applied for separation of the hook and loop fastener.

The hook support 20 may also comprise the activation device for providing the activating signal to the hook elements and/or loop material depending on the particular design of the releasable fastener system. For example, the support 20 may be a resistance type-heating block to provide a thermal energy signal sufficient to cause a shape change and/or change in flexural modulus properties for hook elements fabricated from a shape memory alloy and/or shape memory polymer.

The hook elements 22 fabricated from the shape memory material may be formed integrally with the hook support 16, or more preferably, may be attached directly to the support 16. For example, an adhesive can be applied (e.g., silver-doped epoxy) to the support 16 and the shape memory hook elements 22 can be mechanically pressed into the adhesive.

The shape memory material may be activated by any suitable means, e.g., a thermal activation signal, a magnetic activation signal, an electrical activation signal, a chemical activation signal, or other like activation signal. For example, a thermal activation signal may be supplied using hot gas (e.g. air), steam, or an electrical current. The thermal activation means may, for example, be in the form of a heated room or enclosure, or an iron for supplying heat, a hot air blower or jet, means for passing an electric current through, or inducing an electrical current in (e.g. by magnetic or microwave interaction), the shape memory material (or through or in an element in thermal contact therewith). In the case of a temperature drop, heat may be extracted by using cold gas, a thermoelectric element, or evaporation of a refrigerant. The activation means may, for example, be in the form of a cool room or enclosure, a cooling probe having a cooled tip, a control signal to a thermoelectric element, a cold air blower or jet, or means for introducing a refrigerant (such a liquid nitrogen) to at least the vicinity of the shape memory material.

It will be appreciated that any number of different products or structural elements can be disassembled using this technique. It is not necessary to know and physically locate the exact position of each fastener of a product. Instead, it is simply necessary to know the transition temperature of the shape memory material utilized within the products, to enable the material to be "activated".

In one embodiment, the process of effecting rapid release includes preconditioning the releasable fastener system 10. As used herein, the term preconditioning is hereinafter defined as minimizing the energy required to effect release (i.e., disengagement) of the releasable fastener system. For example, shape memory alloys can have a composition that thermally transform between a martensite structure and an austenite structure at a certain temperature or temperature range. Preconditioning the releasable fastener system comprises maintaining the releasable fastener system at a preconditioning temperature just below the transformation temperature. In this manner, the activation signal, e.g., a thermal activation signal, requires minimal energy to effect thermal transformation since the transformation temperature is greater than the preconditioning temperature. As such, preconditioning minimizes the amount of additional heating and time necessary to cause transformation of the shape memory material, thereby providing rapid release on the order of a few milliseconds, if desired. In a preferred embodiment, the preconditioning does not cause any transformation of the shape memory material and/or a decrease in engagement strength of the joint, unless intentionally designed.

Figure 4:
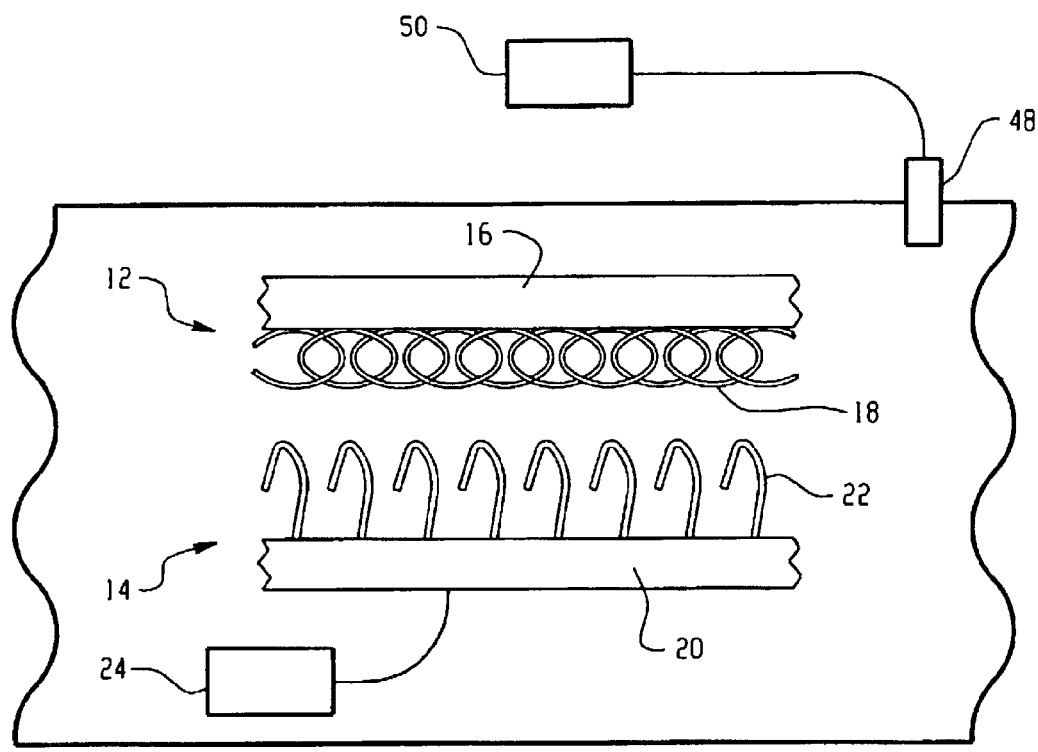
FIG. 4 is a schematic of a releasable fastener system and an exemplary preconditioning system.

For releasable fasteners systems based on thermal activation signals, such as may be the case with shape memory alloys and shape memory polymers, maintaining the preconditioning temperature below the transformation temperature may comprise providing a secondary activation signal to the releasable fastener system at about a level below that which would normally cause transformation of the shape memory material. In this manner, a primary activation signal can then be provided to effect disengagement, wherein the primary signal would require minimal energy and time to effect disengagement. In an alternative embodiment, the environment in which the releasable fastener system is disposed may be maintained at a temperature below the transformation temperature. In either embodiment, preconditioning may comprise a temperature sensor 48 and a controller 50 in operative communication with the releasable fastener system as shown in FIG. 4. A feedback loop may be provided to the activation device so as to provide the secondary activation signal if so configured. Otherwise, the temperature sensor 48 and controller 50 precondition the environment to minimize the time to transition the shape memory material to its transformation temperature by means of the primary activation signal. The preconditioning may be static or transient depending on the desired configuration.

Transient preconditioning may be desirable for those applications wherein energy conservation is desired. For example, current pre-crash warning systems are generally designed to err on the side of false detects. That is, pre-crash warning systems generally capture all detects that are associated with an impending crash and react accordingly. However, some detects may be near misses, which detects do not trigger an event. A releasable fastener system employing a transient preconditioning system can be integrated with, for example, the pre-crash warning system to provide preconditioning to the releasable fastener system for each detect by the precrash warning system. In the event a crash actually occurs (i.e., a crash detect by a crash sensor), the preconditioned environment minimizes the energy and time to effect complete release (i.e., transformation of the shape memory material) of the releasable fastener system 10. This embodiment would dramatically reduce the power requirements to effect release of the fastener system based on a subsequent detect by a crash sensor.

In a preferred embodiment, the preconditioning temperature is greater than about 50 percent of the temperature difference between the ambient temperature and the transformation temperature, with greater than about 80 percent preferred, with greater than about 90 percent more preferred, and with greater than about 95 percent even more preferred.

It should be noted that to effect release, i.e., disengagement, the activation signal may cause a rapid transformation or a delayed transformation. A rapid transformation may be desired for those applications that require rapid release such as may be desirable during a crash event that desires release of various components to minimize the kinetic energy associated with the crash. As such, it generally does not matter with respect to reversibility. In contrast, where a delayed transformation is desired, reversibility is preferred. For example, one of the components fastened together by the releasable fastener system may need a repair or replacement such as may be the case for a battery indirectly secured by the releasable fastener system to a vehicle chassis. In this example, a delay time on the order of a few seconds may be acceptable to effect disengagement. The controller 50 can be readily programmed to cause disengagement within the desired times suitable for the intended application. For example, the controller can be programmed to provide either a high current or a low current to a resistive heating element in thermal communication with the hook elements of the releasable fastener system. The high current could be used to provide rapid irreversible release whereas the low current could be used to provide delayed reversible release of the hook elements. The use of the high and low current in the manner described is exemplary and is not intended to limit the programming variety available for the controller 50 or to define the conditions for reversibility.

In another embodiment, the shape memory material employed for the hook portion 14 and/or the loop portion 12 has two different actuation conditions, wherein the actuation condition causes a change in the shape orientation and/or flexural modulus property to the respective hook or loop portion. In this manner, partial release can be achieved in anticipation of an event such as a crash or full release can be selectively effected for one component that is attached by the releasable fastener system. As such, the hook elements can be randomly grouped or regionally grouped depending on the desired application. This effectively reduces the energy required to cause release of the remaining engaged hook elements and/or loop material. For example, a first activation signal would be delivered to a portion of the hook elements 22 and/or loop material 18 having a first actuation condition, e.g., first actuation temperature. The first activation signal can be programmed to be delivered during conditions warranting enhanced probability of a crash, e.g., driving at speeds exceeding a predefined value, lateral accelerations exceeding a predefined value, and the like. A second actuation condition would be required to effect release of the remaining engaged hook elements 22. In this case, a second activation signal would be delivered to effect complete release. An algorithm or the like may be employed with the controller to program the first and second actuation conditions.

Figure 5:
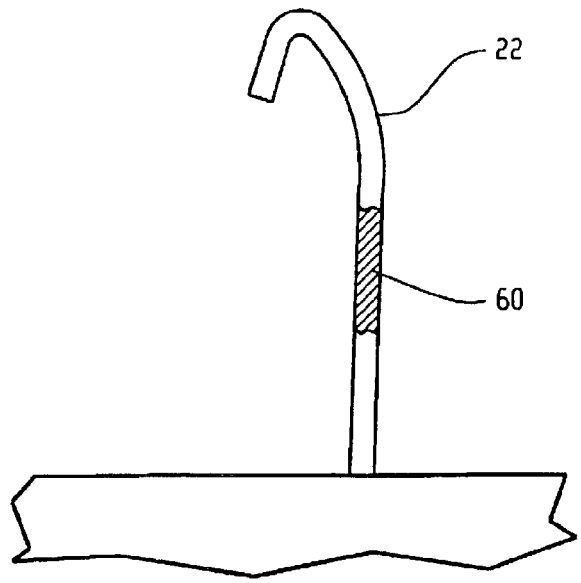
FIG. 5 is a cross section of a hook element in accordance with another embodiment.

In applications where reversibility is not desired, the hook elements 22 and/or loop material 18 preferably comprises a fuse portion 60 within its structure. The fuse portion 60 preferably, but not necessarily, comprises a relatively short region of material with a low melt temperature and/or a high electrical resistance. FIG. 5 illustrates an exemplary hook element including the fuse portion 60. By increasing the resistance of the fuse portion within the hook element (or loop portion), an increase in temperature will occur. The increase in temperature can be then used to melt an opposing loop material 18 in contact therewith, thereby providing disengagement. Similarly, if the fuse portion comprises a lower melt temperature than the rest of the structure, melting the fuse portion can effect disengagement such as, for example, through failure/separation of the hook element at the site of the fuse portion 60.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A process for disengaging a releasable fastener system, comprising:

preconditioning the releasable fastener system to a preconditioning temperature, wherein the releasable fastener system comprises a hook portion comprising a plurality of hook elements fabricated from a shape memory material and a loop portion engageable with the plurality of hook elements, and wherein the preconditioning temperature is less than the transformation temperature of the shape memory material and greater than an ambient temperature;

applying a primary activation signal to the hook portion to change a shape orientation, a flexural modulus property, or a combination thereof to the plurality of hook elements; and disengaging the hook portion from the loop portion.

2. The process of claim 1, wherein preconditioning the releasable fastener system comprises periodically heating the releasable fastener system to the preconditioning temperature.

3. The process of claim 1, wherein the shape memory material comprises a shape memory polymer, a shape memory alloy, a composite of different shape memory alloys or combinations comprising at least one of the foregoing shape memory materials.

4. The process of claim 1, wherein the shape memory alloy fiber comprises a nickel-titanium based alloy, an indium-titanium based alloy, a nickel-aluminum based alloy, a copper based alloy, a gold-cadmium based alloy, an iron-platinum based alloys, or an iron-palladium based alloys.

5. The process of claim 1, wherein the shape memory polymer comprises polyphosphazenes, poly(vinyl alcohols), polyamides, polyester amides, poly(ammo acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, or copolymers thereof.

6. The process of claim 1, wherein preconditioning the releasable fastener system comprises heating the environment in which the releasable fastener system is disposed.

7. The process of claim 1, wherein preconditioning the releasable fastener system comprises applying a secondary activation signal to the releasable fastener system to heat the plurality of hook elements.

8. The process of claim 1, wherein applying the primary activation signal releases the plurality of hook elements from the loop portion in less than about 0.5 seconds.

9. The process of claim 1, wherein the preconditioning temperature is greater than about 50 percent of the temperature difference between the ambient temperature and the transformation temperature.

10. A process for operating a releasable fastener system, comprising:

periodically preconditioning the releasable fastener system to a preconditioning temperature upon receipt of a first signal, wherein the releasable fastener system comprises a hook portion comprising a plurality of hook elements fabricated from the shape memory material and a loop portion engageable with the plurality of hook elements, and wherein the preconditioning temperature is less than a transformation temperature of the shape memory material;

applying a second signal to the hook portion to change a shape orientation, a flexural modulus property, or a combination thereof to the plurality of hook elements, wherein the second signal raises the preconditioning temperature to the transformation temperature; and disengaging the hook portion from the loop portion, wherein the releasable fastener system remains engaged in the absence of the second signal.

11. The process of claim 10, wherein the shape memory material comprises a shape memory polymer, a shape memory alloy, a composite of different shape memory alloys or combinations comprising at least one of the foregoing shape memory materials.

12. The process of claim 11, wherein the shape memory alloy comprises a nickel-titanium based alloy, an indium-titanium based alloy, a nickel-aluminum based alloy, a copper based alloy, a gold-cadmium based alloy, an iron-platinum based alloys, or an iron-palladium based alloys.

13. The process of claim 10, wherein the shape memory polymer comprises polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, or copolymers thereof.

14. The process of claim 10, wherein the plurality of hook elements fabricated from the shape memory material does not transform during periodic preconditioning.

15. The process of claim 10, wherein applying the second signal releases the plurality of hook elements from the loop material in less than about 0.5 seconds.

16. The process of claim 10, wherein the preconditioning temperature is greater than about 50 percent of the temperature difference between an ambient temperature and the transformation temperature.

17. A process for operating a releasable fastener system, comprising:

preconditioning the releasable fastener system to a preconditioning temperature;

applying a first activation signal to the releasable fastener system, wherein the releasable fastener system comprises a hook portion and a loop portion engageable with the plurality of hook elements disposed on the hook portion, wherein each one of the plurality of hook elements comprises a fuse portion having a lower melting point temperature than a remaining portion of each one of the plurality of hook elements, wherein the preconditioning temperature is below the lower melting point temperature of the fuse portion;

melting the fuse portion of the plurality of hook elements with the activation signal; and irreversibly disengaging the hook portion front the loop portion.

* * * * *